US009475218B2

United States Patent
Vermilyea et al.

(10) Patent No.: US 9,475,218 B2
(45) Date of Patent: Oct. 25, 2016

(54) APPARATUS AND METHOD FOR FORMING FLANGES ON COMPONENTS

(71) Applicant: General Electric Company, Schenectady, NY (US)

(72) Inventors: Mark Ernest Vermilyea, Niskayuna, NY (US); Nicholas Joseph Kray, Mason, OH (US); Matthew Allen Radebach, Webberville, MI (US); Alexander Joseph Vallee, Jr., Brighton, MI (US); Craig Douglas Carmichael, Tucson, AZ (US)

(73) Assignee: General Electric Company, Niskayuna, NY (US)

( * ) Notice: Subject to any disclaimer, the term of this patent is extended or adjusted under 35 U.S.C. 154(b) by 315 days.

(21) Appl. No.: 14/221,583

(22) Filed: Mar. 21, 2014

(65) Prior Publication Data

US 2015/0266213 A1    Sep. 24, 2015

(51) Int. Cl.
| | |
|---|---|
| B29C 57/02 | (2006.01) |
| B29C 43/02 | (2006.01) |
| B29C 70/44 | (2006.01) |
| B29C 33/50 | (2006.01) |
| B29C 57/06 | (2006.01) |
| B29L 31/00 | (2006.01) |

(52) U.S. Cl.
CPC ............ *B29C 43/027* (2013.01); *B29C 33/505* (2013.01); *B29C 57/06* (2013.01); *B29C 70/44* (2013.01); *B29C 70/446* (2013.01); *B29C 2043/028* (2013.01); *B29L 2031/772* (2013.01)

(58) Field of Classification Search
CPC ... B29C 43/027; B29C 33/505; B29C 57/06; B29C 70/44

USPC .......................................................... 425/392
See application file for complete search history.

(56) References Cited

U.S. PATENT DOCUMENTS

| | | | |
|---|---|---|---|
| 6,071,460 A | 6/2000 | Renaudin et al. | |
| 6,361,840 B2 | 3/2002 | Nelson et al. | |

(Continued)

FOREIGN PATENT DOCUMENTS

| | | |
|---|---|---|
| EP | 2479014 A1 | 7/2012 |
| EP | 2682245 A2 | 1/2014 |

(Continued)

OTHER PUBLICATIONS

European Search Report and Written Opinion issued in connection with corresponding EP Application No. 15159495.9-1706 dated Aug. 5, 2015.

*Primary Examiner* — Alison L Hindenlang
*Assistant Examiner* — Thukhanh T Nguyen
(74) *Attorney, Agent, or Firm* — Francis T. Coppa

(57) ABSTRACT

An apparatus for forming a flange on a component is presented. The apparatus includes a mold disposed for the placement of the component thereon, a forming tool, and a tubular bladder. The forming tool is assembled to hold the component with a first portion extending into a space defined between the mold and the forming tool. The tubular bladder has a non-uniform wall thickness around its cross section along a longitudinal dimension of the bladder. The bladder is disposed in a step defined in the mold, and configured to impart a forming force to the portion extending into the space to form the flange on the component when the bladder is inflated. A method for forming the flange on the component is also provided.

25 Claims, 5 Drawing Sheets

(56) References Cited

U.S. PATENT DOCUMENTS

| | | | |
|---|---|---|---|
| 7,128,558 B2 * | 10/2006 | Lum | B29C 57/06 |
| | | | 425/393 |
| 7,261,720 B2 | 8/2007 | Stevens et al. | |
| 8,535,042 B1 | 9/2013 | Kirkpatrick et al. | |
| 8,556,618 B2 | 10/2013 | Bergmann | |
| 2004/0113315 A1 | 6/2004 | Graham | |
| 2007/0107733 A1 | 5/2007 | Ho et al. | |
| 2010/0207304 A1 | 8/2010 | Kirkpatrick | |
| 2013/0049258 A1 | 2/2013 | Rotter et al. | |
| 2013/0092372 A1 | 4/2013 | Clapp et al. | |

FOREIGN PATENT DOCUMENTS

| | | |
|---|---|---|
| WO | 2006049509 A2 | 5/2006 |
| WO | 2012076308 A1 | 6/2012 |

* cited by examiner

APPARATUS AND METHOD FOR FORMING FLANGES ON COMPONENTS

BACKGROUND OF THE INVENTION

The invention relates generally to an apparatus and a method for forming flanges on components. More particularly, this invention relates to an apparatus and a method for forming flanges on composite components.

Composite materials are widely used in various industries, and particularly in the aerospace industry, because of their high strength-to-weight ratio. The aerospace components made from composite materials may require precise tolerances to enhance several parameters such as structural integrity, performance, and fatigue life. More particularly, fiber-reinforced composite materials may be used for aircraft structural components such as, for example, fan cases. Some structural components include flanges, which may increase the stiffness of the structural components, and/or facilitate the assembly of the structural components into other components. As used herein, the term "flange" may indicate a raised rim, lip, or other projection from a surface of a fitting.

Some conventional processes used for forming metal parts have been implemented to form the flanges. However, these methods were not suitable to form the flanges on composite components. A process for forming composite components generally includes coupling composite plies, and subsequently curing the composite plies. Some known processes for forming flanges on composite components, such as a hand lay-up process, usually result in inconsistent laminate quality and large dimensional variations within the composite plies. Additionally, these forming processes are labor intensive, and the quality of the flanges can be operator-dependent. Moreover, these forming processes may require extensive post-molding machining to obtain desired tolerances, which may increase the cost of manufacturing.

It has been also difficult to form flanges automatically or semi-automatically due to the complexity of the motion and the intricacy of the manipulation during material placement. This is because the automated lay-up machines have limitations on the geometry of the composite components, for example radial flanges on cylindrical structures, and the geometry of the flanges.

Therefore, it would be desirable to have an improved apparatus and methods for forming flanges on the composite components. It would further be desirable to have an improved apparatus and methods for forming flanges to be suitable for use in automated or semi-automated composite lay-up processes.

BRIEF DESCRIPTION OF THE INVENTION

One embodiment of the invention is directed to an apparatus for forming a flange on a component. The apparatus includes a mold disposed for the placement of the component thereon, a forming tool, and a tubular bladder. The forming tool is assembled to hold the component with a first portion extending into a space defined between the mold and the forming tool. The tubular bladder has a non-uniform wall thickness around its cross section, along a longitudinal dimension of the bladder. The bladder is disposed in a step defined in the mold, and configured to impart a forming force to the portion extending into the space, to form the flange on the component when the bladder is inflated.

Another embodiment of the invention is directed to a method for forming a flange on a component. The method includes the steps of placing the component on a mold, and placing a tubular bladder within a step defined in the mold. The bladder is disposed in the step to be positioned between the mold and the component. The tubular bladder has a non-uniform wall thickness around its cross section, along a longitudinal dimension of the bladder. A forming tool is assembled to hold the component, with a first portion of the component extending into a space defined between the mold and the forming tool. The tubular bladder is then inflated to impart a forming force to the first portion of the component to form the flange on the component.

DRAWINGS

These and other features and aspects of the present invention will become better understood when the following detailed description is read with reference to the accompanying drawings, in which like characters represent like parts throughout the drawings.

DETAILED DESCRIPTION

The embodiments described herein relate to flanged composite components, an apparatus and methods for manufacturing flanged composite components. It should be understood that the embodiments are not limited to composite flanges on cylindrical components, for example fan casings for gas turbine engines, and it will be understood that the descriptions and figures are not limited to fan casings. The embodiments described herein may be utilized on any flanged component fabricated from composite materials.

Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The terms "comprising," "including," and "having" are intended to be inclusive, and mean that there may be additional elements other than the listed elements. As used herein, the term "and/or" includes any and all combinations of one or more of the associated listed items.

Figure 1:
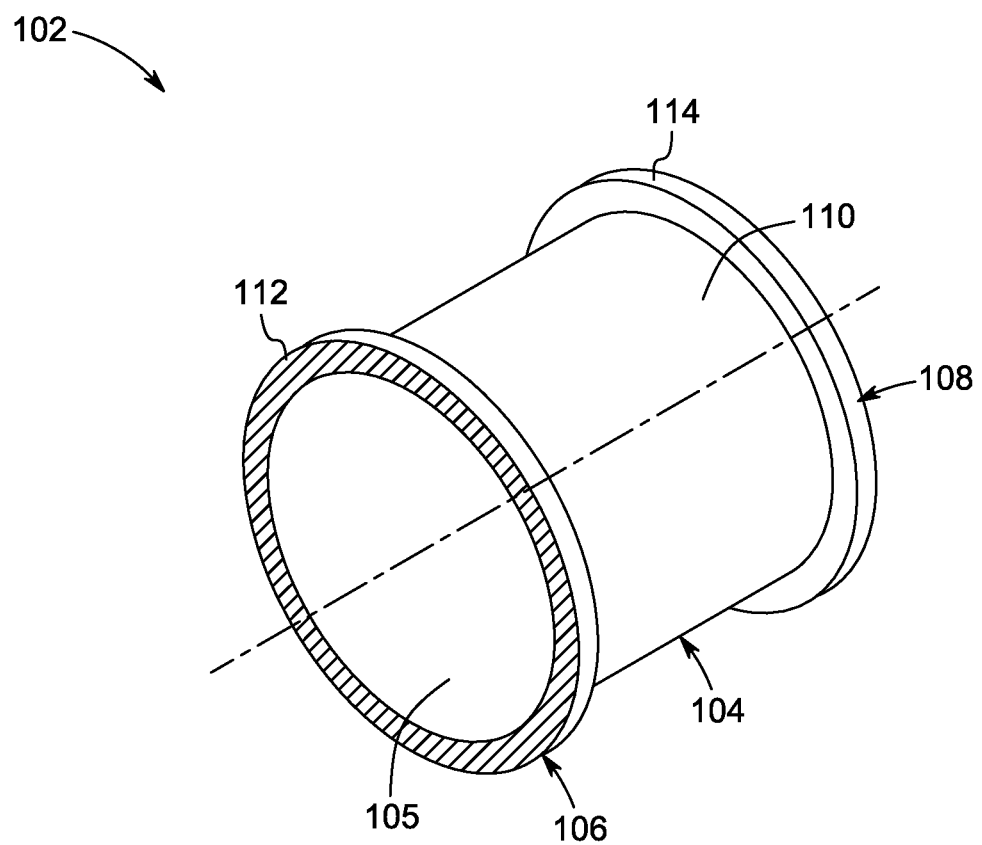
FIG. 1 is a perspective view of an exemplary flanged component.

FIG. 1 illustrates a perspective view of an exemplary flanged component 102. The flanged component 102 includes a generally cylindrical member 104, such as, but not limited to, a fan casing having a first end 106 and a rear end 108. The fan casing 104 includes an aerodynamic duct 105 that houses a fan (not shown), wherein the fan casing 104 includes ballistic requirements to facilitate protecting a wing and aircraft fuselage (not shown) in the event of fan failure. The fan casing 104 includes a body 110 having flanges 112 and 114, wherein the flange 112 is coupled to the first end 106 and the flange 114 is coupled to the rear end 108. Alternatively, the body 110 may include more than two flanges 112 and 114 or less than two flanges 112 and 114. In the exemplary embodiment, the flanges 112 and 114 are integrally coupled to the body 110.

Figure 2:
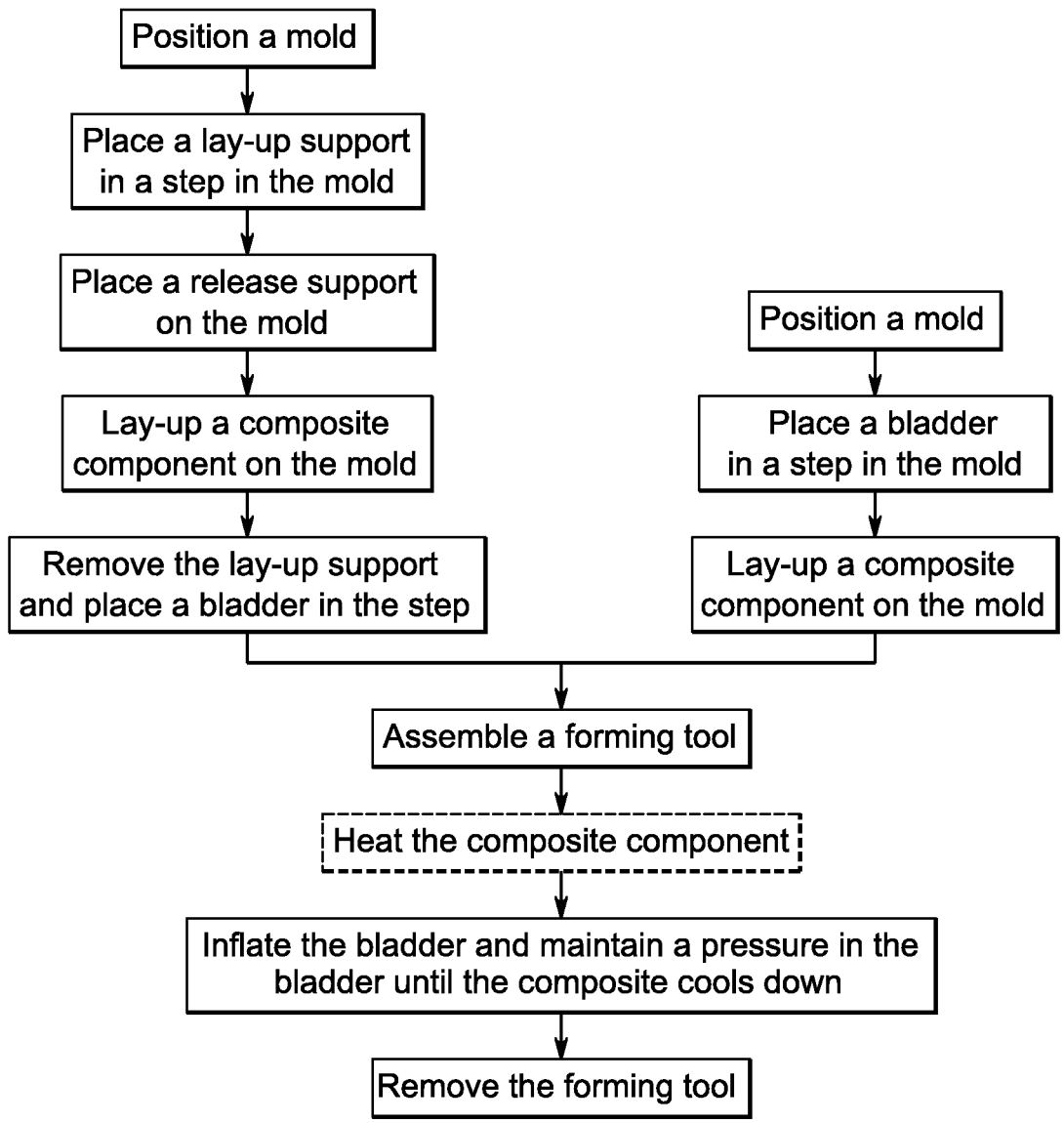
FIG. 2 is a flow chart illustrating a method for manufacturing a flange on a component, in accordance with one embodiment of the invention.
Figure 4:
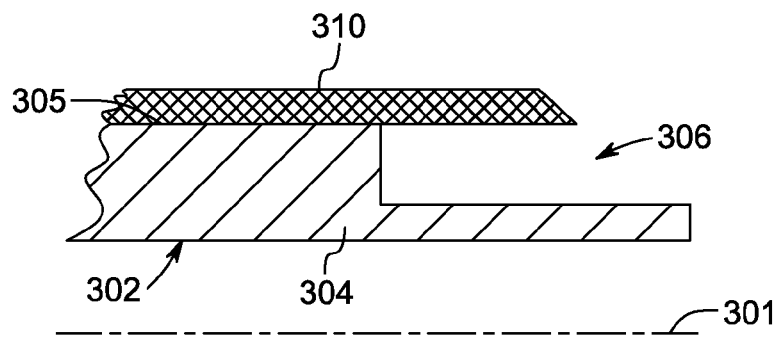
FIG. 4 is a schematic depicting a step of removing the support structure for laying-up the composite component on the mold according to the method steps of FIG. 2, in accordance with one embodiment of the invention.
Figure 5:
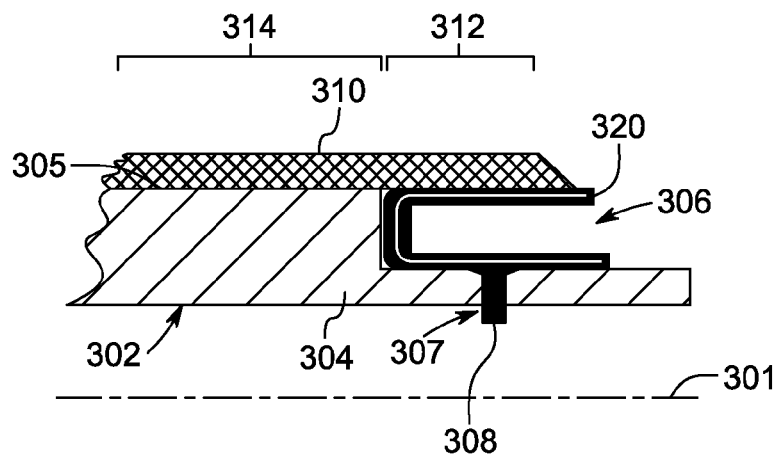
FIG. 5 is a schematic depicting a bladder disposed on the mold according to the method steps of FIG. 2, in accordance with one embodiment of the invention.
Figure 6:
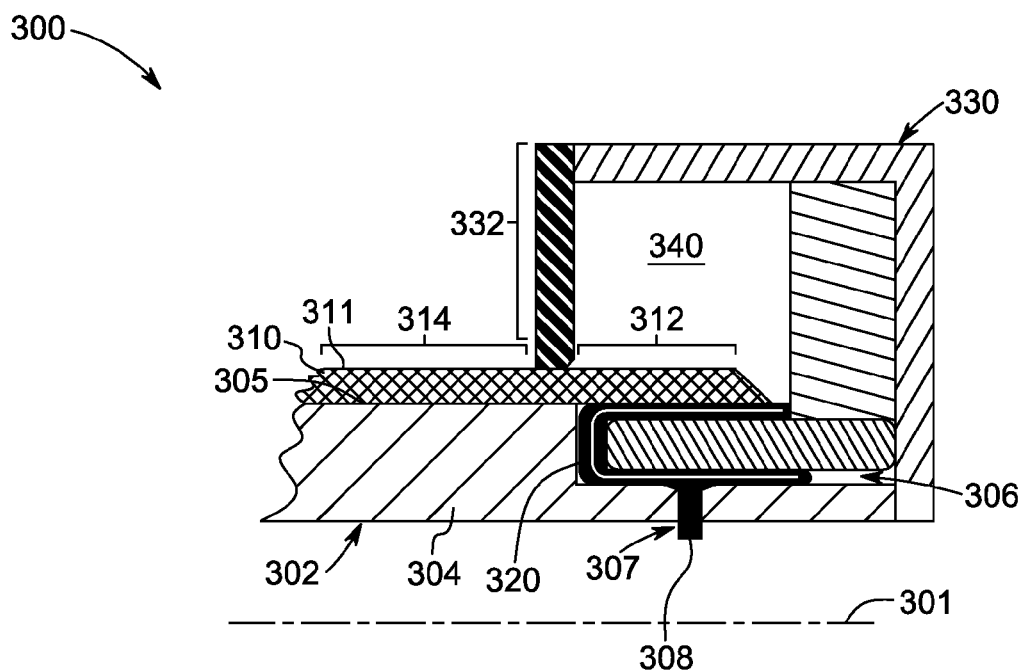
FIG. 6 is schematic of a cross-sectional side view of a forming apparatus, in accordance with one embodiment of the invention.

FIG. 2 is a flow chart illustrating method steps, and FIGS. 3-7 schematically represent cross-sectional side views demonstrating corresponding manufacturing stages for forming a flange on a component (for example, the component 102 of FIG. 1), according to the aspects of the present invention. FIG. 6 is a cross-sectional side view of half portion of an exemplary flange forming apparatus 300 coupled to a component 310. (The whole apparatus would be a body of revolution of the cross-section view of FIG. 6 about an axis 301). The component 310 is a cylindrical component similar to the component 102 as described with respect to FIG. 1. The apparatus 300 is configured to facilitate molding at least one flange similar to the flanges 112 and/or 114 (referring to FIG. 1) onto an end of the cylindrical component 310. The apparatus 300 includes a mold 302 for the placement of the component 310 thereon, a bladder 320 and a forming tool 330.

In some embodiments, the component 310 comprises a composite material. As used herein, the term "composite material" indicates a material including two or more constituent materials with different physical or chemical properties. The constituent material may generally comprise two categories: matrix material and reinforcement material. The matrix material surrounds and supports the reinforcement material, and may comprise a metal or a non-metal material. Non-limiting examples of the non-metal material may include various resins, e.g., thermoset epoxies and thermoplastics. More specific, suitable examples of the resins may include, but are not limited to, polyester resin, acrylic resin, vinyl ester resin, epoxy resin, polyurethane resin, phenolic resin, polyamide resin and mixtures thereof. Non-limiting examples of the reinforcement material may comprise fibers. Suitable examples of fibers may include, but are not limited to, glass fiber, graphite fiber, carbon fiber, ceramic fiber, aromatic polyamide fiber, and mixtures thereof. The fibers may be continuous or discontinuous.

In some instances, the composite component 310 includes a prepreg. The one or more fibers may be pre-impregnated with the one or more resins to form a prepreg prior to being laid-down or placed on the mold 302. In one example, the composite component 310 may comprise carbon fiber and an epoxy resin. The component 310 may include any material that enables a flanged component, for example, the fan casing of FIG. 1, to function as described herein.

FIGS. 3-7 are provided for illustrative purposes only to place the present invention in an exemplary field of use. It should be appreciated that the invention is not limited to any particular type of mold and/or forming tool.

Referring to FIG. 2 and FIGS. 3-7, the method includes placing or laying-up the composite component 310 on the mold 302. FIGS. 3-7 show half cross-sectional views of the apparatus in various steps, and a centerline rotation axis is 301. The mold 302 includes a mandrel 304 having a cylindrical shape configured to rotate about the axis 301. In some alternative examples, the mold 302 may include some other elements with other shapes, such as a rectangular shape. The mold 302 may be formed from a variety of materials with a selected hardness, including but not limited to metals or metal alloys. The mandrel 304 includes a periphery surface 305 that may have one or more steps disposed around the periphery surface 305 to form one or more flanges on the component 310 (similar to what is shown for the component 102 in FIG. 1). As illustrated in FIGS. 3-7, a step 306 is defined in a portion of the periphery surface 305. In some embodiments, the mandrel 304 may include two steps for forming two flanges on the component 310. Additionally, for the configurations shown in FIGS. 5-7, the mandrel 304 can further include an inlet 307 for receiving a means, e.g. a valve 308 for inflating the bladder.

Figure 3:
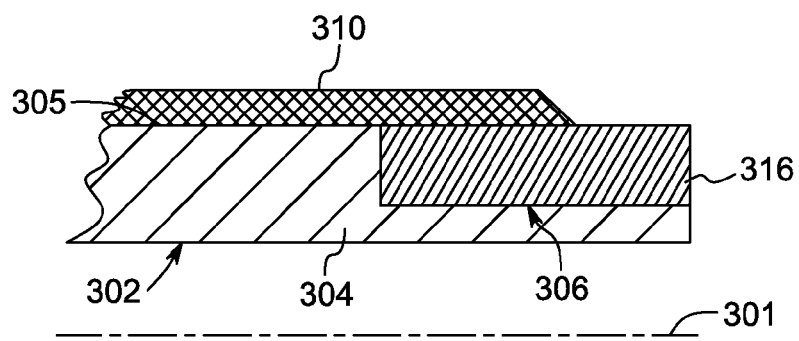
FIG. 3 is a schematic depicting a step of placing a support structure for laying-up a composite component on a mold according to the method steps of FIG. 2, in accordance with one embodiment of the invention.

The flow chart of FIG. 2 describes alternative ways to dispose (position or place or lay-up) the composite component 310 on the mandrel 304. In some specific embodiments, the cylindrical composite component is disposed around the periphery surface 305 of the circular mandrel 304. In some embodiments, a support structure 316 (for example, a lay-up support) may optionally be positioned in the step 306, as shown in FIG. 3, before placing or laying up the component 310 on the mandrel 304 to provide support while positioning the component 310 on the mold 302. In these embodiments, a release sheet (not shown) may often be disposed on the support structure 316 before the placement of the component 310. After the placement of the composite component 310 on the mandrel 304, the support structure 316 is removed as shown in FIG. 4, to place a bladder 320 in the step 306, as depicted in FIG. 5. In alternative embodiments, the bladder 320 may be positioned in the step 306 before laying-up the component 310 on the mandrel 304. The composite component 310 can be laid down or positioned on the mold 302 using any method known in the art. Non-limiting examples include the tape placement technique, the fiber placement technique, and the hand lay-up technique.

In the illustrated arrangement of FIG. 5, the valve 308 is received in the inlet 307 and connected to the bladder 320 with one end (not labeled) thereof. It should be noted that for some embodiments, the valve 308 may be an integral part of bladder 320, for example. In other embodiments, the valve 308 may be a separate element that is connected to the bladder 320. The other end of the valve 308 may be connected to a hose (not shown), which may be connected to a source (not shown) for delivering a gas, air or liquid into the bladder 320 for inflation. (Unlike other components as shown in FIGS. 3-7, the valve 308 does not revolve about the centerline axis 301).

As illustrated in FIG. 5, the composite component 310 is positioned on the periphery surface 305, so that at least a first portion 312 of the component 310 extends into the step 306 where the bladder 320 is disposed. The first portion 312 of the component 310 may be arranged to be used for forming a flange on the component 310. The first portion 312 may be referred to as a flange portion. In some embodiments, the bladder 320 is a tubular bladder that is disposed within the step 306 so as to be located around the mandrel 304, and to be flush with the peripheral surface 305 of the mandrel 304. That is, the bladder 320 may be flush with an outer diameter of the mandrel 304. Alternatively, the bladder 320 may be lower or higher than the outer diameter of the mandrel 304. In these arrangements, the bladder 320 is positioned between the mold 302 and the flange portion 312 of the component 310 extending across the step 306.

The bladder 320 may comprise any flexible material that is configured to be inflatable. Some examples of the flexible material may include, but are not limited to, silicone rubber, fluoro-elastomer, and nylon bagging films.

Figure 8:
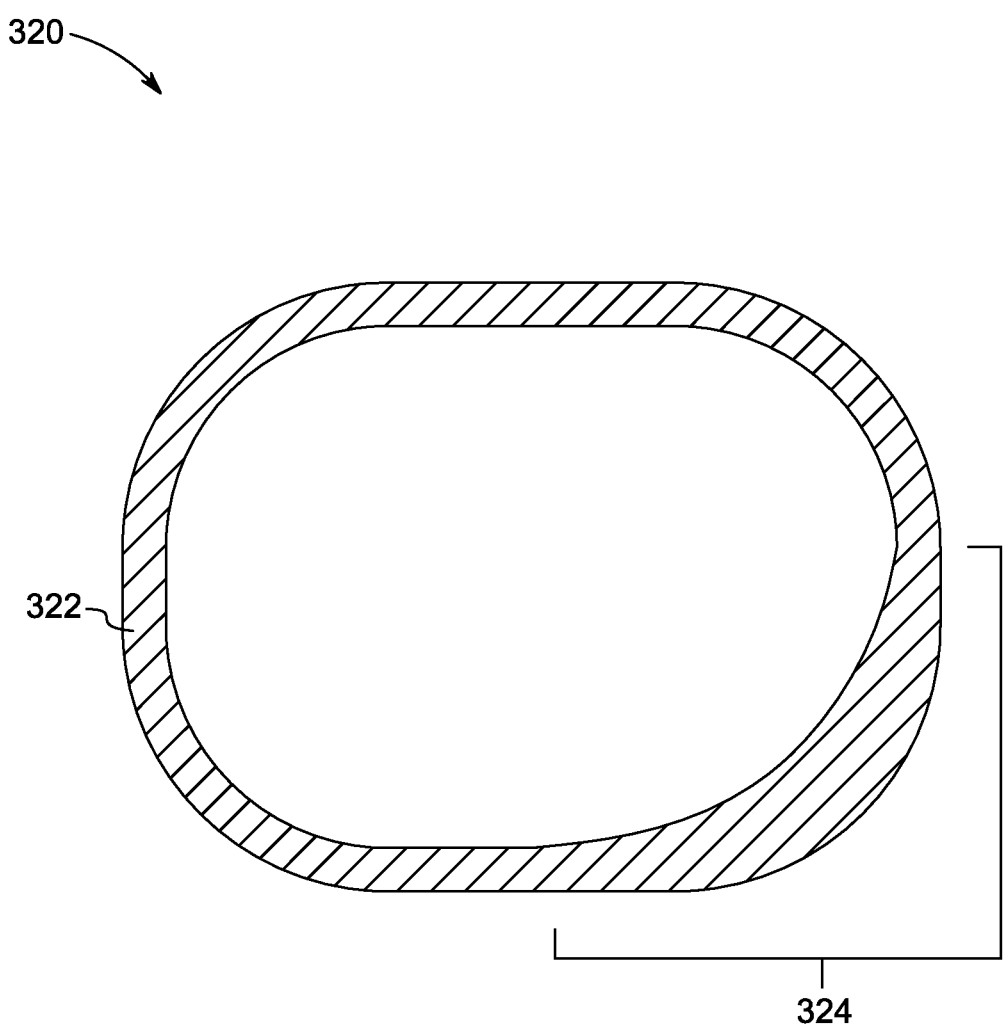
FIG. 8 is a cross sectional view of a bladder having non-uniform wall thickness, in accordance with one embodiment of the invention.

Typically, a tubular bladder, prior to inflation, is flat when viewed in cross-section having uniform wall thickness, which when pressurized and unrestrained, becomes a torus. According to some embodiments of the present invention, the tubular bladder 320 has a non-uniform wall thickness around its cross-section. FIG. 8 represents a cross sectional view of the tubular bladder 320 having a wall 322. The thickness of the wall 322 of the tube 320 may decrease or increase in various regions around its cross section. In illustrated example, a portion 324 of the tube has greater wall thickness than the rest of the tube. Further, the bladder 320 may be axisymmetric i.e. symmetric about the axis 301.

FIG. 6 illustrates the apparatus 300 equipped with a forming tool 330. Referring to FIG. 2, after placement of the composite component 310 and the bladder 320 on the mandrel 304, the forming tool 330 may be assembled to hold the composite component 310 on the periphery surface 305 of the mandrel 304, around the mold 302. In the illustrated embodiments, the forming tool 330 defines a space 340 between the mold 302 and the forming tool 330. The bladder 320 and the first portion 312 of the component 310 are received in the space 340. A portion 332 of the forming tool 330 retains the composite component 310, e.g., its extended first portion 312, adjacent to the space 340. The remainder of the portion, i.e. a second portion 314 of the component 310, can be immovably held or fixed relative to the mold 302. During the forming process, the portion 332 of the forming tool 330 holds the component 310 on the mandrel 304 to avoid any movement of the component 310.

As illustrated, the portion 332 of the forming tool 330 extends partially across the step 306 to hold the portion 312, as shown in FIG. 6. In some arrangements, the forming tool 330 may not extend across the step 306 according to different applications. In one non-limiting example, the portion 332 of the forming tool 330 may further be configured to determine a length of the desired flange. That is, according to different desired lengths of the flanges, the forming tool 330 may be positioned at different positions of the component 310 to obtain flanges with desired lengths. In some embodiments of the invention, the forming tool 330 may comprise a variety of materials and shapes. In one example, the forming tool 330 comprises one or more metal bands.

Figure 7:
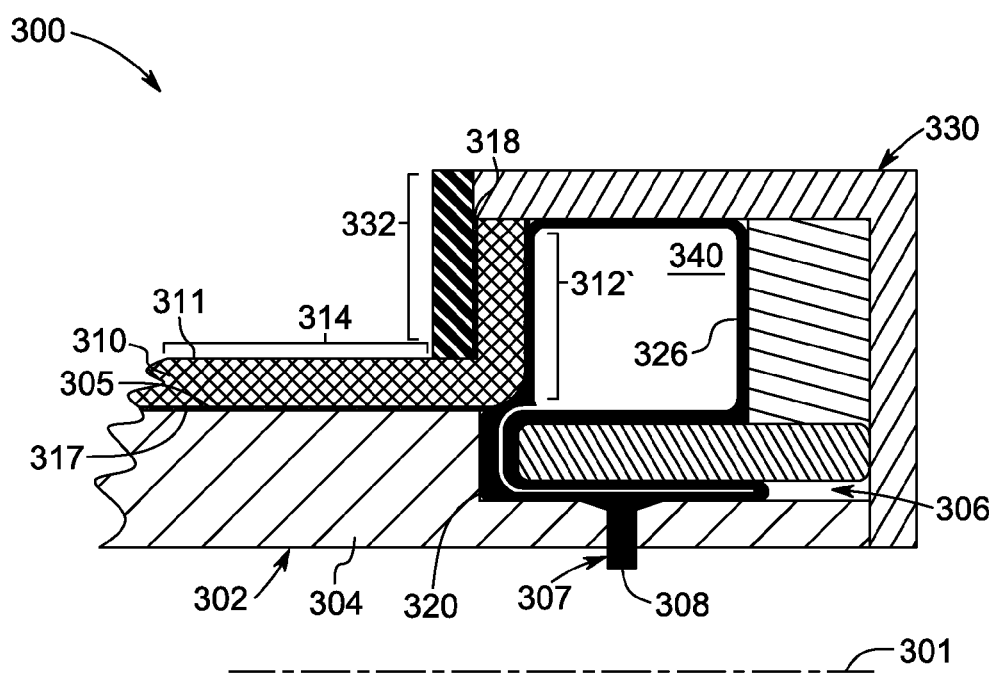
FIG. 7 is a schematic illustrating the formation of a flange on the composite component, in accordance with one embodiment of the invention.

Additionally, as indicated in FIGS. 6 and 7, the portion 332 of the forming tool 330 is substantially perpendicular to a surface 311 of the component 310. In other examples, the portion 332 may be angled (not shown) so as to form a flange that is not perpendicular to the surface 311.

Subsequently, referring to the flow chart of FIG. 2, after securely assembling the forming tool 330, a substance, such as air may be delivered into the bladder 320 through the valve 308. Thus, as shown in FIG. 7, the bladder 320 is inflated, and this inflated bladder 326 is confined in the space 340 so as to impart a forming force to bend or deform the flange portion 312 to form a flange 312'. The bladder 320 may be inflated to a pressure at which the flange portion 312 deforms into a desired shape. In some embodiments, the forming tool 330 may be configured to react to the forming force to facilitate the formation of the flange 312', while pressing or holding the composite component 310 securely on the mandrel 304. In some embodiments, the component 310 (for example, in a prepreg form) may be heated to a temperature to reduce the viscosity of the composite before inflating the bladder 320. In some instances, the temperature may range from about 30 degrees Celsius to about 90 degrees Celsius, depending on the resin used in the composite material and a desired pressure and time required to form the flange.

The forming process may often be effected by a bladder when inflated to apply a pressure (or a forming force) on a component or a portion of the component, to deform the portion into a desired shape. Typically, when a uniform wall thickness bladder is used, it is usually toroid in shape upon inflation. The circular cross section of the toroidal bladder need not occupy substantially the entire space (for example, space 340 as shown in FIG. 6) between a mold and a forming tool, but can instead allow for one or more cavities (unoccupied space by the inflated bladder). In such situations, the bladder (having a uniform wall thickness) may be unable to provide a required forming force on some portions of the component during the formation process. The inflated bladder thus would fail to adequately form or compact the component to the desired shape, and to achieve the composite quality. Therefore, conventional forming processes may require extensive and complex post-molding machining to obtain desired tolerances, which may increase the cost of manufacturing.

According to the aspects of the present invention, the bladder 320 having non-uniform wall thickness takes such a shape upon inflation that a cross section of the inflated bladder 326 conforms to a volume of the space 340 (referring to FIG. 7). In other words, the wall thickness of the bladder 320 can be varied, corresponding to a required shape of the inflated bladder 326 to conform to substantially the entire volume of the space 340. In some embodiments, the bladder 320 imparts a uniform forming force to the length of the flange portion 312. In some other embodiments, the bladder 320 may impart a non-uniform forming force suitable for the thick portions of the component, and/or for the formation of a desired complex shape. For example, to form a flange that includes an additional axial section, the forming forces can be tailored to particular locations of the flange portion, by using a variable thickness bladder. Thus, a non-uniform wall thickness bladder enables one to achieve desired shapes and compaction without degrading the composite quality. In brief, aspects of the present invention provide improved composite component formation and local consolidation, and further minimize/simplify mold tooling positioning issues and post-molding machining.

After forming the flange 312', the composite component 310 (which is present in prepreg form) having the flange 312', may be cured. As will be recognized by those skilled in the art, the cure process and conditions may depend upon the material (the fiber and the resin) of the composite component 310. In one non-limiting example, the apparatus 300 with the composite component 310 therein may be placed in an oven (not shown), and heated to a desired temperature for a desired duration, depending on the material of the component 310. In another non-limiting example, the apparatus 300 with the composite component 310 therein may be placed in an oven and heated to a desired temperature prior to inflating the bladder 320. In these instances, the bladder 320 may be inflated during/after the curing, and the flange 312' is formed. For other component material (for example, a composite material containing a thermoplastic resin), it may not be necessary to heat the composite component 310 for curing.

In addition, in some embodiments of the invention, the portion 332 may be detachable from the forming tool 330. Further, the forming tool 330 and the composite component 310 may be detachable from the mandrel 304. These arrangements enables removal/detachment of the composite component 310 and the forming tool 330 from the mandrel 304.

In certain embodiments, as known to those skilled in the art, the apparatus 300 may further comprise a first release film 317 disposed between the mandrel 304 and the composite component 310 (as shown in FIG. 7), to facilitate the detachment of the component 310 from the mandrel 304 after the flange 312' is formed and/or cured. Additionally, in some examples, the apparatus 300 may comprise a second release film 318 (FIG. 7) disposed between the composite component 310 and the portion 332 of the forming tool 330. The second release film 318 facilitates the removal of the portion 332 from the composite component 310, after the flange 312' is formed and/or cured. The first and second release films 317, 318 may be the same or different, which can be easily implemented by one skilled in the art. The release films are usually situated between the surfaces of the components that would otherwise be in contact with each other.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, all of the patents, patent applications, articles, and texts which are mentioned above are incorporated herein by reference.

The invention claimed is:

1. An apparatus for forming a flange on a component, comprising:
   a mold disposed for placement of the component thereon;
   a forming tool assembled to hold the component with a first portion extending into a space defined between the mold and the forming tool; and
   a tubular bladder disposed in a step defined in the mold and configured to impart a forming force to the portion extending into the space to form the flange on the component when the bladder is inflated, wherein the bladder has a non-uniform wall thickness around its cross section along a longitudinal dimension of the bladder.

2. The apparatus of claim 1, wherein the component comprises a composite material.

3. The apparatus of claim 2, wherein the component comprises one or more fibers and one or more resins.

4. The apparatus of claim 1, wherein the component comprises a cylindrical component.

5. The apparatus of claim 4, wherein the cylindrical component is disposed around a periphery surface of a mold.

6. The apparatus of claim 1, wherein the bladder is disposed within the step to be positioned between the mold and the first portion of the component extending into the space.

7. The apparatus of claim 1, wherein the bladder is axisymmetric, and is disposed around the mold.

8. The apparatus of claim 1, wherein the cross section of the bladder is configured to conform to the space upon inflation.

9. The apparatus of claim 1, wherein a second portion of the component is immovably held on the mold by the forming tool.

10. The apparatus of claim 1, wherein a portion of the forming tool extends partially across the step.

11. The apparatus of claim 1, wherein the forming tool is configured to react to a forming force to facilitate the formation of the flange.

12. A method for forming a flange on a component, the method comprising:
    placing the component on a mold defining a step;
    placing a tubular bladder within the step to be positioned between the mold and the component, wherein the bladder has a non-uniform wall thickness around its cross section along a longitudinal dimension of the bladder;
    assembling a forming tool to hold the component with a first portion of the component extending into a space defined between the mold and the forming tool; and
    inflating the bladder to impart a forming force to the first portion of the component to form the flange on the component.

13. The method of claim 12, further comprising providing a support structure within the step before placing the component on the mold.

14. The method of claim 13, further comprising removing the support structure after placing the component on the mold.

15. The method of claim 12, wherein the component comprises a composite material.

16. The method of claim 15, wherein the composite material comprises one or more fibers and one or more resins.

17. The method of claim 16, wherein the one or more fibers are pre-impregnated with the one or more resins.

18. The method of claim 12, wherein placing the component on the mold comprises placing the component in a prepreg form.

19. The method of claim 12, wherein assembling the forming tool further comprises holding a second portion of the component so that it is immovably retained on the mold.

20. The method of claim 12, further comprising heating the component to a temperature in a range from about 30 degrees Celsius to about 90 degrees Celsius before inflating the bladder.

21. The method of claim 12, further comprising curing the component after inflating the bladder for forming the flange on the component.

22. The method of claim 12, further comprising curing the component prior to inflation of the bladder, or during inflation of the bladder, so as to form the flange on the component.

23. The method of claim 12, wherein inflating the bladder comprises inflating the bladder to conform to the space.

24. The method of claim 12, wherein inflating the bladder comprises providing uniform pressure on the first portion of the component.

25. The method of claim 12, wherein inflating the bladder comprises providing a non-uniform pressure on a plurality of locations on the portion of the component, to deform the first portion in a desired shape.

\* \* \* \* \*